(12) United States Patent
Reesink et al.

(10) Patent No.: US 9,011,675 B2
(45) Date of Patent: Apr. 21, 2015

(54) PROCESS FOR THE REMOVAL OF SULFUR COMPOUNDS FROM HYDROCARBON FEEDSTOCKS

(75) Inventors: Bernard Hendrik Reesink, Doorn (NL); Nico Van Gasteren, Houten (NL)

(73) Assignee: BASF Corporation, Florham Park, NJ (US)

( * ) Notice: Subject to any disclaimer, the term of this patent is extended or adjusted under 35 U.S.C. 154(b) by 182 days.

(21) Appl. No.: 10/573,051

(22) PCT Filed: Sep. 15, 2004

(86) PCT No.: PCT/NL2004/000639
§ 371 (c)(1),
(2), (4) Date: Mar. 22, 2006

(87) PCT Pub. No.: WO2005/028403
PCT Pub. Date: Mar. 31, 2005

(65) Prior Publication Data
US 2007/0102324 A1 May 10, 2007

(30) Foreign Application Priority Data

Sep. 23, 2003 (EP) .................................. 03077830

(51) Int. Cl.
| | | |
|---|---|---|
| *C10G 45/06* | (2006.01) | |
| *B01J 20/02* | (2006.01) | |
| *B01J 23/755* | (2006.01) | |
| *B01J 37/03* | (2006.01) | |
| *B01J 37/20* | (2006.01) | |
| *C10G 25/00* | (2006.01) | |

(52) U.S. Cl.
CPC .............. *B01J 20/02* (2013.01); *B01J 20/0225* (2013.01); *B01J 23/755* (2013.01); *B01J 37/03* (2013.01); *B01J 37/20* (2013.01); *C10G 25/003* (2013.01); *C10G 2300/1096* (2013.01); *C10G 2300/202* (2013.01); *C10G 2300/705* (2013.01)

(58) Field of Classification Search
USPC ....... 208/213, 217; 429/12; 436/37; 502/337, 502/406
See application file for complete search history.

(56) References Cited

U.S. PATENT DOCUMENTS

| | | | |
|---|---|---|---|
| 2,951,034 A * | 8/1960 | Stuart ........................... | 208/244 |
| 3,016,347 A | 1/1962 | O'Hara | |
| 3,016,348 A | 1/1962 | Holden | |
| 3,821,123 A | 6/1974 | Pollitzer et al. | |
| 4,634,515 A * | 1/1987 | Bailey et al. .................... | 208/91 |
| 4,636,487 A | 1/1987 | Parrott et al. | |
| 5,059,539 A * | 10/1991 | Kimber et al. .................. | 436/37 |
| 5,223,470 A * | 6/1993 | Bouwman et al. ............. | 502/222 |
| 2004/0091753 A1 * | 5/2004 | Terorde et al. .................. | 429/12 |
| 2007/0010234 A1 | 1/2007 | Chazelas et al. | |

FOREIGN PATENT DOCUMENTS

| | | |
|---|---|---|
| EP | 0 955096 A1 | 11/1999 |
| EP | 2463260 A2 | 6/2012 |
| GB | 1 444 498 A | 3/1969 |
| GB | 1240134 | 7/1971 |
| GB | 2162194 A | 1/1986 |
| GE | 1144498 | 4/1969 |
| WO | 9420212 A1 | 9/1994 |

OTHER PUBLICATIONS

International Search Report, PCT/NL04/000639, Feb. 1, 2005.

* cited by examiner

*Primary Examiner* — Randy Boyer
(74) *Attorney, Agent, or Firm* — Elizabeth Pietrowski

(57) ABSTRACT

The invention is directed to a process for the removal of contaminating sulfur compounds, more in particular thiophenic sulfur compounds, from hydrocarbon feedstocks, said process comprising contacting the feedstock in the presence of hydrogen with a sulfided nickel adsorbent, of which adsorbent the rate constant for tetralin hydrogenation activity at 150° C. is less than 0.01 l/s.g cat and wherein in said adsorbent part of the nickel is present in the metallic form.

23 Claims, No Drawings

PROCESS FOR THE REMOVAL OF SULFUR COMPOUNDS FROM HYDROCARBON FEEDSTOCKS

The invention is directed to a process for the removal of sulfur compounds from hydrocarbon feedstocks, more in particular to the removal of thiophenic compounds from feedstocks comprising benzene and/or hydrocarbon resins.

In chemical processes, such as hydrogenation and/or dehydrogenation, often a problem presents itself in that the sulfur and/or sulfur components in the feedstocks negatively affects the lifetime of a catalyst used in the processes, especially in the case of nickel catalysts. To avoid this problem, much attention has been paid to the removal of sulfur compounds from the gaseous or liquid feedstock prior to the actual hydrogenation and/or dehydrogenation. Further, the presence of sulfur is quite often undesirable in view of the intended use of the hydrogenated material.

An important system for the removal of sulfur compounds from hydrocarbon feedstocks is based on the adsorption of the sulfur compounds on an adsorbent. Well-known adsorbents are for example nickel adsorbents. These nickel adsorbents generally are in the form of supported nickel metal crystallites.

Other systems that are known, are based on the adsorption of the sulfur compound on an metal oxide, resulting in a reaction between the metal oxide and the sulfur compound, producing a stable metal sulfide.

In U.S. Pat. No. 5,482,616 a process for the removal of sulfur compound is disclosed, wherein the sulfur compound is removed by contact with a combined adsorbent based on a metal oxide that forms stable metal sulfides under the reaction conditions, and a hydrogenating component, such as nickel or a precious metal.

In U.S. Pat. No. 5,223,470 a nickel on alumina catalyst has been described, which has been promoted with sulfur, for the selective hydrogenation of edible oils.

In general sulfur impurities are present in feedstocks as sulfides, mercaptans or thiophenes. However, in some feedstocks such as certain benzene feedstocks, middle distillates, gasoline, kerosene, MTBE and hydrocarbon resins, the sulfur impurities are for example present as higher thiophenes or other sulfur compounds having low reactivity (such as dimethyl-thiosulfonate). Examples of feedstocks that contain such sulfur compounds are feedstocks used in the production of various hydrocarbons and related compounds, such as benzene, toluene, MTBE, furfural and related compounds, hydrocarbon resins and the like.

Quite often, it is a requirement, that the treatment does not result in hydrogenation of the hydrocarbon feedstock. For example, in case sulfur compounds have to be removed from benzene, hydrogenation of the benzene would result in a decrease of yield of the process.

U.S. Pat. No. 6,503,388 is directed to a process for hydrogenating feedstocks containing thiophenic impurities comprising contacting the feed with a combination of a platinum group catalyst and a nickel catalyst, whereby the amount of sulfur removed from the feed is considerably raised.

The capacity of a nickel adsorbent for sulfur compounds is in general in the order of magnitude of 14 wt. %. This number is valid in case the sulfur impurities are in the form of sulfides and/or mercaptans. However, in case the sulfur is in the form of higher S-compounds, such as thiopheriic compounds, the capacity decreases to about 2 wt. %. As a result the amount of adsorbent that is required increases strongly when these sulfur compounds are present in the feedstock.

Accordingly, it is an object of the invention to provide a process for the removal of sulfur compounds from hydrocarbon feedstocks, more in particular to the removal of thiophenic compounds from feedstocks comprising benzene and/or hydrocarbon resins, wherein the capacity of the adsorbent is increased, preferably to a value comparable to that for sulfides and mercaptans.

The present invention is based on the insight, that a nickel adsorbent of which the nickel surface has been deactivated, meets this object, provided that the desulfurisation is carried out in the presence of hydrogen. More in particular it is important, that the nickel adsorbent has a remaining adsorption capacity for sulfur. This means that on the one hand, the adsorbent should be sulfided in a sufficient amount to prevent hydrogenation of the hydrocarbon, while at the same time being able to adsorb heavier sulfur compounds, such as thiophenic sulfur compounds.

The invention is accordingly directed to a process for the removal of contaminating sulfur compounds from hydrocarbon feedstocks, said process comprising contacting the feedstock in the presence of hydrogen with a nickel adsorbent, of which adsorbent the nickel surface has been deactivated with S or an S-compound. The invention is accordingly defined as a process for the removal of contaminating sulfur compounds, more in particular thiophenic sulfur compounds, from hydrocarbon feedstocks, said process comprising contacting the feedstock in the presence of hydrogen with a sulfided nickel adsorbent, of which adsorbent the rate constant for tetralin hydrogenation activity at 150° C. is less than 0.01 l/s.g cat and wherein in said adsorbent part of the nickel is present in the metallic form The rate constant for tetralin hydrogenation ,one of the essential features of the catalyst to be used in the present invention, is determined as follows. In a micro-reactor the gas phase hydrogenation of tetralin is performed. A hydrogen flow of 50 cm$^3$(STP)/min having a tetralin concentration corresponding to a saturation temperature of 13.6° C. is led through a reactor at 150° C. The catalyst bed consists of 200 mg (0.1-2.0 cm$^3$ of density 0.2-2.0 g/cm$^3$) of catalyst in a sieve fraction of 30-60 mesh and diluted with inert material in the same mesh size.(at atmospheric pressure and GHSV of 30-300 l/h). The reaction products are analyzed in line with a gas chromatograph.

From the analyses the tetralin conversion is calculated.

(Conversion=(tetralin in−tetralin out)/tetralin in).

The calculation results in a rate constant k expressed as l/s.g(catalyst).

($k$=−GHSV*(ln(1−conversion))/Weight).

The activity of the material to be used in the process of the invention should be such that the rate constant at 150° C. is less than 0.01 l/s.g cat. This means in practice that almost no tetralin is hydrogenated.

This feature of the invention corresponds in general to a hydrogen adsorption capacity of less than 10 micro-moles/g.cat. measured with static hydrogen chemisorption at 50 C (ASTM method D 3908-82).

An other important feature of the invention resides therein that part of the nickel is present as metal. Preferably this is at least 10%, on atomic basis. The upper limit of the amount of metallic nickel is determined by the fact that no unwanted hydrogenation of the feedstock occurs. This feature is determined in the first place by the tetralin rate constant and in a preferred embodiment by the requirement that the nickel surface has an atomic S to Ni ratio of at least 0.5.

It is quite surprising that the process of the invention provides a good removal, as desulfurisation in the absence of hydrogen with merely a nickel adsorbent does not work, and desulfurization with a regular nickel adsorbent in the presence of hydrogen results in a run away of the reaction, as hydrogenation of the feedstock occurs.

It is important to note that the process of the invention differs essentially from the well-known hydro desulfurization (HDS) processes. In these processes the sulfur containing feedstock is treated with a fully sulfided catalyst. The sulfur containing compounds are hydrogenated over the catalyst and generally broken down to hydrogen sulfide, which is removed subsequently. On an atomic basis, the amount of sulfur at the beginning of the catalyst bed and at the end, after the hydrogenation treatment is the same. Contrary thereto, the process of the present invention uses an adsorbent and results in a decrease of the sulfur content of the feedstock.

The invention is applicable for the removal of contaminating sulfur compounds from hydrocarbon feedstocks, more in particular those feedstocks described hereinabove.

The invention can even be used for the treatment of feedstocks that contain unsaturation, which should not be hydrogenated. It has been found that the process of the invention results in efficient removal of the contaminating sulfur compounds, without hydrogenation of the feedstock. However, in some instances, the condition may be adapted to obtain stabilisation of a feedstock, such as removal of gum precursors (styrene type compounds),which requires hydrogenation of some unsaturated components.

In a preferred embodiment of the invention the adsorbent is used in combination with a metal oxide adsorbent. The metal of the adsorbent is a metal that forms stable sulfides under the conditions applied in the process for the removal of contaminating sulfur compounds from hydrocarbon feedstocks. This metal oxide can either be used in the nickel adsorbent, such as described in U.S. Pat. No. 5,482,616, although the adsorbent does not necessarily has to meet all the criteria of said invention. For example, it is possible to use simple physical mixtures, not meeting the requirements of the particle size thereof.

In another embodiment it is possible to treat the effluent of the treatment with the nickel adsorbent, with the said metal oxide, preferably in a bed thereof.

In both embodiments, the effect is a further improved and more reliable sulfur removal.

The removal of the contaminating sulfur compounds is preferably done at a hydrogen partial pressure is between 0.1 and 200 bar and preferably between 10 and 75 bar and more in particular between 30 and 50 bar. The temperature is preferably between 50 and 300° C., preferably between 100 and 200° C.

The process is preferably carried out with an LHSV between 0.1 and 10 hr$^{-1}$, whereas the GHSV preferably lies between 50 and 5000 hr$^{-1}$.

The adsorbent may be prepared by a process wherein a passivated nickel adsorbent material containing oxidic nickel, optionally on a support or in the presence of a structural promoter, is reduced with hydrogen at a temperature between 100 and 200° C., followed by treatment of the surface of the reduced material with sulfur or a sulfur compound, preferably in an inert solvent, to yield the nickel adsorbent as defined hereinabove. In case a nickel adsorbent is prepared directly from a nickel oxide precursor, without prior reduction and passivation, as above, the temperature of reduction is preferably between 100 and 500° C.

The sulfur compounds to be used are preferably aromatic sulfur compounds, such as di-benzo-thiophene, 2-methyl thiophene, benzothiophene or dimethyl thiophene. It is also possible to use sulfur powder, polysulfide and the like. The treatment encompasses preferably precipitating S, a polysulfide or an S-compound on the nickel adsorbent, or impregnating the nickel adsorbent with S, a polysulfide or an S-compound sulfur compound. Coprecipitation of the catalyst including the sulphur as described in U.S. Pat. No. 5,223,470 is also a possibility. An advantage of this latter process is the improved activity of the final nickel adsorbent. This process includes a step of coprecipitating a precursor for the adsorbent from a solution containing nickel, optionally a dissolved or solid support or structural promoter precursor material and a sulfur compound, and calcining and/or passivating the precipitated imaterial.

EXAMPLE 1

A 60 wt. % nickel on silica adsorbent was prepared by coprecipitation. Sulphur was added in the precipitation step as a sulphide salt. The precipitate was washed with de-ionized water and filtered. The filter-cake was dried and calcined. The calcined material was extruded into ¹⁄₁₆" trilobes. The extrudates were dried, calcined and reduced/stabilized.

The product is adsorbent B and contained 60 wt. % Ni and 2.75 wt. % Sulphur. Adsorbent B was evaluated in the tetralin activity test after reduction in hydrogen at 425° C. for 2 hours and had a rate constant of 0.0085 l/s.g(cat.) at 150° C. The amount of metallic nickel in the adsorbent was 30%, calculated on the total amount of nickel.

EXAMPLE 2

A 60 wt. % nickel extrudate (reduced and passivated) was applied as the base adsorbent. This material was loaded in a reactor and treated with a paraffinic solvent containing 100 ppm Sulphur as di-benzo-thiophene. The adsorbent was treated at 150° C. and 30 bar hydrogen pressure. At LHSV 10 l/hr; GHSV 1500 l/hr the treatment was monitored measuring the DBT content in the effluent. Once the effluent sulphur content and the feed sulphur content were constant the treatment was considered as finished. Next the adsorbent was dried. The adsorbent obtained is adsorbent A Adsorbent A was loaded in a fixed bed reactor and applied in the desulphurization of benzene. The feed contained 4.0 wt-ppm S as thiophene. The conditions were as follows: LHSV 2 l/hr; GHSV 500 l/hr.

The results at 170° C. were as follows:
Pressure 10 bar
92.5% removal or 308 ppb S in the product
Pressure 20 bar
98.5% removal or 59 ppb S in the product
Pressure 40 bar
99.6% removal or 28 ppb S in the product Under the above conditions no benzene hydrogenation activity was observed.

EXAMPLE 3

Adsorbent A was loaded in a fixed bed reactor and applied in the desulphurization of benzene that contained additionally 1000 wt-ppm Styrene. Styrene is a typical component in crude benzene and causes often fouling problems, due to polymer formation on the catalyst surface. The feed contained 4.0 wt-ppm S as thiophene.

The conditions were as follows: LHSV 2 l/hr; GHSV 500 l/hr

The results at 150° C. and 40 bar pressure are as follows:
Benzene conversion 0%
Styrene conversion 100%
Thiophene conv. 99.0%

The invention claimed is:
1. A process for removing a contaminating sulfur compound from a hydrocarbon feedstock, comprising:
   deactivating a surface of a nickel adsorbent with S, a polysulfide or a S-compound to form a sulfided nickel adsorbent;
   contacting the hydrocarbon feedstock with the sulfided nickel adsorbent in the presence of hydrogen,
   removing the contaminating sulfur compound from the hydrocarbon feedstock,
   wherein the sulfided nickel adsorbent has a hydrogen adsorption capacity of less than or equal to 10 micromoles/g cat,
   wherein an adsorbent part of the sulfided nickel adsorbent comprises at least 10%, on an atomic basis of metallic Ni, and
   wherein a surface of the sulfided nickel adsorbent has an atomic S to Ni ratio of at least 0.5.
2. The process according to claim 1, wherein the nickel adsorbent further comprises a metal oxide that forms a stable sulfide.
3. The process according to claim 1, wherein the deactivating further comprises
   precipitating the S, the polysulfide or the S-compound on the surface of the nickel adsorbent;
   coprecipitating the S, the polysulfide or the S-compound with nickel adsorbent precursors, or
   impregnating the nickel adsorbent with the S, the polysulfide or the S-compound.
4. The process according to claim 1, wherein the
   the deactivating further comprises deactivating the surface of the nickel adsorbent with the S-compound is selected from the group containing di-benzo-thiophene, 2-methyl thiophene, benzothiophene and dimethyl thiophene to form the sulfided nickel adsorbent.
5. The process according to claim 1, wherein the sulfided nickel adsorbent further comprises silica.
6. The process according to claim 1, wherein the sulfided nickel adsorbent is a calcined, reduced coprecipitant of the sulfided nickel adsorbent and silica.
7. The process according to claim 1, wherein the process is carried out in a fixed bed or slurry phase.
8. The process according to claim 1, wherein the process is conducted at a hydrogen partial pressure from 0.1 to 200 bar.
9. The process according to claim 1, wherein the process is conducted at a hydrogen partial pressure from 10 to 75 bar.
10. The process according to claim 1, wherein the process is conducted at a hydrogen partial pressure from 30 to 50 bar.
11. The process according to claim 1, wherein the process is conducted at a temperature from 50 to 300 degrees C.
12. The process according to claim 1, wherein the process is conducted at a temperature from 100 to 200 degrees C.
13. The process according to claim 1, wherein the process is carried out with an LHSV from 0.1 to 10 $hr^{-1}$.
14. The process according to claim 13, wherein the process is carried out with a GHSV between from 50 to 500 hr-1.
15. The process according to claim 1, wherein the deactivating further comprises reducing the nickel adsorbent with hydrogen.
16. The process according to claim 15, wherein the reducing the nickel adsorbent is conducted with the hydrogen at a temperature from 100 to 200 degrees C.
17. The process according to claim 1, wherein the deactivating is conducted at a temperature from 100 to 500 degrees C.
18. The process according to claim 1 wherein the nickel adsorbent contains a structural promoter.
19. The process of claim 2, wherein the nickel adsorbent is on a support.
20. The process according to claim 1, wherein the deactivating further comprises deactivating the surface of the nickel adsorbent with aromatic sulfur compound.
21. The process according to claim 1, wherein the contaminating sulfur compound comprises a thiophenic sulfur compound.
22. The process according to claim 21, wherein the sulfided nickel adsorbent has a rate constant for tetralin hydrogenation activity at 150° C. of less than 0.01l/s.g cat.
23. The process according to claim 1, wherein the removing further comprises removing substantially all of the contaminating sulfur compound from the hydrocarbon feedstock without removing hydrocarbon from the hydrocarbon feedstock.

* * * * *